United States Patent [19]

Manfredi

[11] Patent Number: 4,790,739

[45] Date of Patent: Dec. 13, 1988

[54] DIE AND BACKING BLOCK ASSEMBLY WITH QUICK RELEASE FASTENING MEANS

[75] Inventor: Walter Manfredi, Milan, Italy

[73] Assignee: Lema S.R.L., Almavilla, Italy

[21] Appl. No.: 57,923

[22] PCT Filed: Oct. 8, 1985

[86] PCT No.: PCT/IT85/00037

§ 371 Date: May 13, 1987

§ 102(e) Date: May 18, 1987

[87] PCT Pub. No.: WO87/02308

PCT Pub. Date: Apr. 23, 1987

[51] Int. Cl.[4] ........................ B29C 33/32; B29C 45/64

[52] U.S. Cl. ................................ 425/192 R; 425/195; 425/595

[58] Field of Search ............... 425/182, 190, 192, 195, 425/595, 193, 406; 24/602, 603; 72/481; 100/918

[56] References Cited

U.S. PATENT DOCUMENTS

| | | | |
|---|---|---|---|
| 3,528,141 | 9/1970 | Anderson et al. | 24/603 |
| 3,638,473 | 2/1972 | McElroy | 100/918 |
| 3,908,500 | 9/1975 | Gargrave et al. | 100/918 |
| 3,965,813 | 6/1976 | Pfost | 100/918 |
| 3,987,681 | 10/1976 | Keithley et al. | 100/918 |
| 4,274,332 | 6/1981 | Nakamura | 100/918 |
| 4,372,738 | 2/1983 | Black et al. | 24/603 |
| 4,490,103 | 12/1984 | Vogt | 425/193 |
| 4,561,626 | 12/1985 | Black | 425/190 |

FOREIGN PATENT DOCUMENTS

| | | | |
|---|---|---|---|
| 0125220 | 11/1984 | European Pat. Off. . | |
| 1177935 | 9/1964 | Fed. Rep. of Germany | 100/918 |
| 3309707 | 9/1984 | Fed. Rep. of Germany . | |
| 437965 | 11/1967 | Switzerland . | |
| 971537 | 9/1964 | United Kingdom . | |
| 2019277 | 10/1979 | United Kingdom . | |

*Primary Examiner*—Willard Hoag

*Attorney, Agent, or Firm*—Michael J. Striker

[57] ABSTRACT

A die and backing block assembly with a quick release fastening arrangement which includes a plurality of connectors, each including a pin connected to the die and having a head insertable into a tubular body connected to a piston lodged in a cylindrical chamber formed in the backing block. The mouth of the tubular body has radial holes accommodating balls which hold the head of the pin in the tubular mouth of the piston under the action of elastic springs, which tend to move the piston away from the head of the pin. The die and the backing block connected to each other are released from each other when oil is injected under pressure into a volume between the bottom of the chamber and the piston. The piston moves towards the head carrying the balls into a seat so that the balls move and release the head of the pin thus allowing for a separation of the die from the backing block.

4 Claims, 2 Drawing Sheets

DIE AND BACKING BLOCK ASSEMBLY WITH QUICK RELEASE FASTENING MEANS

BACKGROUND OF THE INVENTION

In order to clamp parts of machines to each other, accurately and safely, use is generally made of screws, bolts and other similar means. Where the connected parts are subjected to high stresses and must frequently be disassembled and reassembled it is clear that the number of screws that must be handled are far too much time and the work becomes incompatible with economic and competitive production. FIG. 1, for example, shows a system at present used in the presses for making ceramic tiles to connect the upper and lower dies each other.

It will be seen from the figure that situated between the upper plate (10), heated by elements (11) and the block (12) heated by elements (13), there are the lower die (14) and the upper die (15) which, when pressure is applied, press on the tile (16) retained at its perimeter by a matrix die (17).

The upper die (15) is held to the upper plate (10) by a series of cheese-headed screws (18) and the lower die (14) is also fixed by cheese-headed screws (20), but between the head of the screw (20) and the die (14) there are two Belleville washers (25-26).

Due to a high pressure applied and to heating, the humidity contained in the clay of which the tile is made, evaporates leaving deposits of lime on the sides of each die, which leads to heavy wear and makes it necessary to replace the pads frequently.

There are many of these dies to be periodically replaced in each press and numerous screws holding them in position consequently should be often replaced, with the press out of action, the time required for replacement is long, making for higher costs of production and lower output.

If quicker means are employed, such as levers, clamps and the like, though this may make it quicker and simpler to disassemble and reassemble the opposed parts, there is generally an adverse effect on safety and accuracy.

SUMMARY OF THE INVENTION

It is an object of the present invention to provide an improved quick release connector of opposing parts, by means of which the above drawbacks would be avoided and at the same time, considerable advantages would be obtained.

A further object of the invention is a quick connection for holding together opposed mechanical parts especially the dies in presses for making ceramic tiles.

In one of the parts to be connected a pin is placed having a head which, with a slight amount of play, penetrates the tubular opening of the central body of a piston sliding in a cylindrical chamber placed in the other part to be connected by the fastener or connector of this invention.

Said piston is subjected to the effects of both an elastic means that tends to hold it away from the head and of a fluid, such as oil or the like, acting in the opposite direction.

The tubular mouth of the central body of the piston, sliding with a slight amount of play in a ringwise seat at the front of the chamber, has radially placed holes passing through it in which small sized balls are lodged.

Ball diameter is less than the radius of the annular seat referred to above, less than the pin radius, but greater than the radius of said seat which is less that of the head.

Coaxial to the annular seat and above it there is a second annular seat the radius of which is greater than the diameter of the balls increased by the radius of the head.

The effect of all the above is that, when the parts to be connected are superimposed, and when the pin head is inside the tubular mouth of the piston to a point beyond the balls, fluid pressure is reduced to nought or at any rate to a value below that created by the elastic means, said elastic means, through the balls, exercises a pulling effect between the piston and the head of the pin sufficient to hold the above two parts together.

On the contrary, when pressure greater than that of the elastic means is generated in the fluid, the piston moves towards the above mentioned head and the balls are carried to the position of the wider seat where there is a sufficient space for them to abandon said head allowing the two held parts to separate from each other and to move away from each other which may also be done by remote control.

Preferably the elastic means is in the form of a spring consisting of a pile of Belleville washers placed around the central body of the piston and reacting between it and the front of the chamber.

The annular seats in the front of the cylindrical chamber, in which the piston slides, are made in a bushing forming the front end of said chamber.

The mouth of the fluid duct opens in the space created between the piston and the bottom of the cylindrical chamber. The central body of the piston is connected to the same by means of a threaded pin which, by being screwed up or unscrewed, makes it possible to vary as desired the position of said piston in relation to the balls and therefore to vary the holding force obtained by said elastic means.

When a certain number of quick release connectors are positioned at suitable points on the parts to be constrained, they are linked up to a single fluid generator in such a way as to obtain simultaneous actuation of to all quick release connectors on the pair of bodies to be connectors to each other and also, if required, to the connectors on all pairs of bodies in a machine.

In presses for making ceramic tiles the pin with a head is screwed into the so-called pad while the piston's cylindrical chamber is formed in the so-called block interposed between the die and the ejection plate which also forms the bottom of said cylindrical chamber.

Forward movement of the piston, pressed by the fluid, causes, at the same time, pressure on the die thereby detaching it from the backing block, which gives considerable functional advantages.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
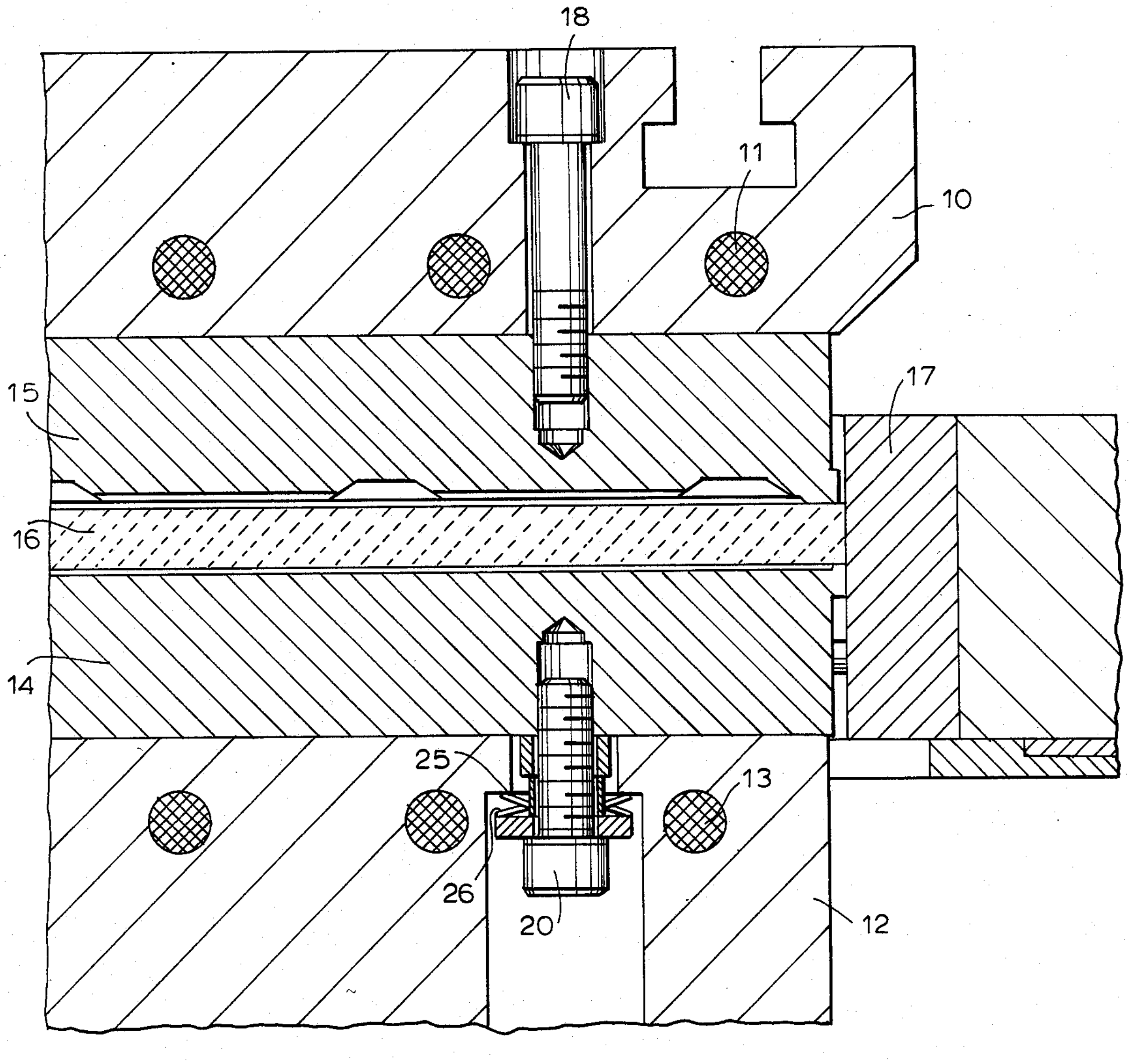
FIG. 1 is a partial sectional view of the press with connectors of the prior art.

Pin (27) has a head (29). The head (29) of pin (27) extends into a central bore of a central body (32) the upper portion of which is supported in a bushing (35) whereas its lower end is supported in a piston (37). Piston (37) has a head (34) and is positioned in a cylindrical chamber (38) formed in a block (36) which is positioned on an ejection plate (43) of the press.

Figure 2:
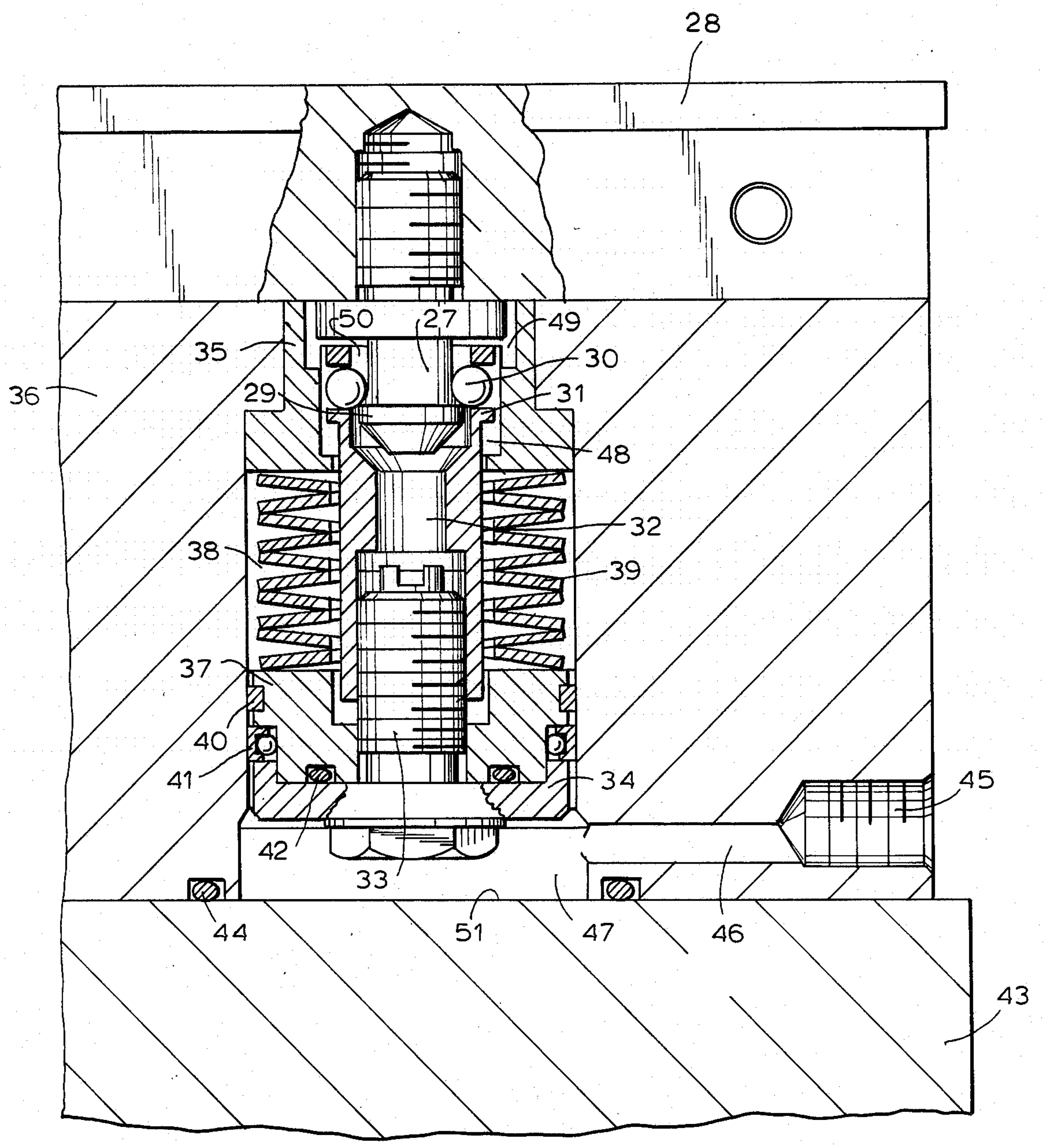
FIG. 2 is a cross section of a quick release connector positioned between a die and a backing block in a press for ceramic tiles according to the invention.

As seen in FIG. 2 threaded pin (27) is connected to die (28). Contact is made on the head (29) of the pin (27) by balls (30), lodged in holes (31) formed at the tubular mouth portion (50) of the central body (32) which is connected to the head (34) of piston (37) by means of threaded pin (33).

Between the piston (37) and the bushing (35) is situated, at the end of the cylindrical chamber (38) cut in the block (36) the pile (39) of Belleville washers.

With a slight play the tubular mouth portion (50) of the central body (32) slides inside the cylindrical seat (48) of the bushing (35) an annular seat (49) is provided in bushing (35).

The guide ring (40) and oil seals (41-42) are mounted on the piston (37). Block (36) has an oil admitting connection (45) and a duct (46) which opens into a chamber or volume (47) formed between a bottom (51) of chamber (38) and head (34) of the piston (37).

Packing (44) is interposed between the block (36) and the ejection plate (43) of the press to which the block is connected by non-shown but any suitable conventional means.

By means of threaded connection (45) oil is admitted into the duct (46) and into the volume (47) between the piston (37) and and the bottom (51) of the chamber (38).

The mode of operation of the device of the invention is as follows. As shown in FIG. 2 the Belleville washers (39) coming into contact with the bushing (35) and therefore the block (36) exercise a pulling effect between the piston (37), the central body (32), the mouth (50), the balls (30) and the head (29) of the pin (27) holding said block against the die (28).

When the die (28) has to be replaced or when it is desired to separate it from the block (36), all that has to be done is to cause oil under pressure to flow into the volume (47). The oil will push the piston (37) towards the head (29) of pin (17) compressing the pile of Belleville washers (39).

The balls (30) will move upwards simultaneously with the head (29) and the die (28), leaving the holes (31) and pushed by the head (29) itself, and will take up a position in the annular seat (49) of the bushing, which is greater than the annular seat (48), allowing the pad (28) to become detached from the block (36). Similar operations executed in the reverse order allow the block (36) to be once more held to the same die (28) or to a new one.

The advantages of the present invention are as follows: Time required for replacing dies is drastically reduced. The press is better exploited, its working costs are thus reduced which also means lowering the costs of the finished product.

Control, which may also be remote, through the fluid duct (46) is extremely convenient and effective.

In addition to constraining the dies in presses for making ceramic tiles, the quick release connectors here described may be used for an infinite variety of applications wherever opposing parts have to be constrained in an entirely reliable manner.

It will be understood that each of the elements described above, or two or more together, may also find a useful application in other types of quick release connectors differing from the types described above.

While the invention has been illustrated and described as embodied in a quick release fastener, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A die and backing block assembly with quick release fastening means for securing the die to the backing block, comprising said backing block being formed with a chamber, said fastening means including a pin connected to said die and having a head; a piston received in said chamber; a tubular body connected to said piston and having a mouth portion for receiving said head; elastic means positioned in said chamber and biasing said piston in a direction away from said head; pressure fluid admitting means connected to said chamber and feeding a pressure fluid into said chamber to force said piston to move towards said head of said pin when pressure of said fluid is greater than a force of said elastic means; bushing means positioned in said chamber and defining a first cylindrical seat and a second cylindrical seat for receiving said tubular body which is able to slide in said first cylindrical seat upon a movement of said piston in said chamber, said tubular body having in a region of said mouth portion a plurality of radial holes, said second cylindrical seat having a diameter which is greater than that of said first cylindrical seat; and a plurality of balls positioned in said radial holes and holding said head of said pin in said mouth portion to secure said die to said backing block when the force of said elastic means maintains said piston in a position remote from said head and said balls are enclosed in said first cylindrical seat, said balls moving along with said mouth portion into said second cylindrical seat upon the movement of said piston towards said head when the force of said elastic means is overcome by the pressure of said fluid admitted into said chamber so as to release said head of said pin from said balls and thus release a connection between said die and said backing block, whereby said die and said backing block can be either secured to each other or released from each other by a single control operation.

2. The assembly as defined in claim 1, wherein said fastening means futher include a threaded tie rod to secure said tubular body to said piston wherein upon screwing and unscrewing of said rod in said tubular portion a position of said piston relative to said balls and thus to have a force of said elastic means acting on said piston are adjusted.

3. The assembly as defined in claim 2, wherein said elastic means is a pile of Belleville washers surrounding said tubular body and supported at one end thereof against said piston and at another end thereof against said bushing means.

4. The assembly as defined in claim 1, wherein said pin is screwed in said die.

* * * * *